(12) United States Patent
Schultink

(10) Patent No.: US 7,654,278 B2
(45) Date of Patent: Feb. 2, 2010

(54) LEVEL CONTROL FOR LIQUID THROUGHFEED

(76) Inventor: Arnold J. Schultink, Torensmalaan 11, NL-9301 CE Roden (NL)

(*) Notice: Subject to any disclaimer, the term of this patent is extended or adjusted under 35 U.S.C. 154(b) by 535 days.

(21) Appl. No.: 10/546,277

(22) PCT Filed: Feb. 26, 2004

(86) PCT No.: PCT/NL2004/000145

§ 371 (c)(1), (2), (4) Date: Jun. 26, 2006

(87) PCT Pub. No.: WO2004/077186

PCT Pub. Date: Sep. 10, 2004

(65) Prior Publication Data

US 2007/0169821 A1    Jul. 26, 2007

(30) Foreign Application Priority Data

Feb. 26, 2003   (NL) .................................. 1022779

(51) Int. Cl.
    F04F 43/00    (2006.01)
(52) U.S. Cl. ................... 137/131; 137/135; 137/142
(58) Field of Classification Search ................. 137/130, 137/131, 135, 142, 411; 417/295
See application file for complete search history.

(56) References Cited

U.S. PATENT DOCUMENTS

| | | | | |
|---|---|---|---|---|
| 354,591 A | * | 12/1886 | Aimond | ........................ 137/129 |
| 698,993 A | * | 4/1902 | Musciacco | ................... 137/135 |
| 717,932 A | * | 1/1903 | Scudder | ........................ 137/135 |
| 790,246 A | * | 5/1905 | Atzerberger | ................... 417/39 |
| 2,698,163 A | * | 12/1954 | Swenson | .................. 366/153.1 |
| 4,887,667 A | * | 12/1989 | Kuhara | .......................... 165/96 |
| 7,306,004 B2 | * | 12/2007 | Sigmans | ..................... 137/433 |

FOREIGN PATENT DOCUMENTS

| | | |
|---|---|---|
| DE | 349 771 C | 3/1922 |
| DE | 455 481 C | 2/1928 |
| DE | 22 39 484 A | 2/1974 |
| DE | 34 39 406 A | 4/1986 |
| DE | 38 34 588 A | 4/1990 |
| GB | 2 123 148 A | 1/1984 |

OTHER PUBLICATIONS

International Search Report (PCT/ISA/210).

* cited by examiner

*Primary Examiner*—John Rivell
*Assistant Examiner*—Craig Price
(74) *Attorney, Agent, or Firm*—Harness, Dickey & Pierce, P.L.C.

(57) ABSTRACT

A reservoir is disclosed for a throughfeed for liquid, such as a liquid pump, to be set into operation selectively, from and/or to a body of liquid such as a pond, aquarium or bath. The reservoir includes a container for containing liquid and with an outlet for connecting onto the throughfeed to the body of water. It further includes a refill container which, depending on the level of the liquid in the container, is movable reciprocally between a high position and at least one lower position, and which is connected to an inlet of the reservoir connected to the body of liquid. The refill container includes an overflow along which liquid flows from the refill container into the container in the at least one lower position of the refill container.

12 Claims, 5 Drawing Sheets

LEVEL CONTROL FOR LIQUID THROUGHFEED

The present invention relates to a device for supplying a throughfeed for liquid, such as a liquid pump, to be set into operation selectively, from and/or to a body of liquid such as a pond, aquarium or bath. Use is normally made here of a reservoir with an inlet and an outlet for containing a liquid for use in the throughfeed, of which the outlet can be connected onto the throughfeed.

Such devices are generally known and serve for instance to prevent the possibility of a throughfeed, such as a liquid pump, being left without any liquid therein. It is furthermore usually desirable that a secondary function can also be fulfilled in-such a device, for instance filtering or sieving of the liquid carried through the reservoir to the throughfeed.

The known devices generally have the drawback that running dry of the throughfeed such as a liquid pump is not prevented effectively enough with the known devices. The reservoir has an insufficient capacity to feed in fresh liquid so as to thus replenish itself. The additional functionalities, such as a sieving action or a filter action, can only be realized under very strict determined conditions. Many of the filter functions in the known devices can for instance only be implemented above the water level of the body of liquid.

A device according to the present invention has for its object to obviate, or at least alleviate, the above stated drawbacks and shortcomings of the known art, for which purpose a device according to the present invention is distinguished by the combination of measures according to the main claim. In such a configuration a very elegant and simple solution is provided for all the above stated problems of the prior art devices and reservoirs.

With a reservoir according to the present invention complicated and complex constructions become unnecessary, and the secondary functions, such as filtering of the liquid, can also be readily implemented in very simple manner. There is moreover certainty that the throughfeed will never be empty of liquid, which in the case of for instance a pump could cause problems.

In a preferred embodiment a reservoir according to the present invention has the features of claim 2. It is noted that a float is a particularly favourable and simple manner of making the position of the refill container correspond with the liquid level in the container.

If the features of claim 3 are then also applied, a space is created between the float and the refill container which can be used to fulfil secondary functions such as sieving, filtering etc.

A reservoir according to the present invention can further display the features of claim 4. A float with such a buoyancy in a reservoir according to the invention, in combination with the liquid level in the body of liquid, achieves that if no liquid is being drawn from the container by the throughfeed, no liquid is replenished either.

In such an embodiment it can be advantageous if a reservoir according to the present invention also has the characteristics of claim 5. The height of the refill container relative to the liquid level in the container and relative to the liquid level in the body of liquid thus defines the operation of the reservoir.

A reservoir according to the invention can further display the features of claim 6 in order to fulfill a secondary function other than a supply function to the throughfeed. Although sieving, filtering etc. are presented in the foregoing as secondary functions, it is by no means the intention to thereby imply that these functions are of less great importance than the supply function to the throughfeed. If a sensitive pump is applied as throughfeed, the sieving or filtering of the liquid can, because of this sensitivity, be a function which is at least as important as providing a sufficient supply capacity. Aside from the importance of pre-filtering for the pump, it is noted that this is also important for a regular purifying process, for instance with a subsequent filtering operation.

A reservoir according to the invention can also have the features of claims 6 and 7. With such regulating means for adjusting a liquid flow on or over the element, the flow capacity through the element can be adjusted to the capacity of the throughfeed (pump), and also in an exceptionally simple manner. Such an embodiment according to the invention with regulating means can preferably comprise a tilting plate which is tiltable relative to the element to selectively leave clear a passage for the liquid. This selectivity can be achieved by manual, automatic and/or controlled adjustment of the position of the tilting plate. Use can even be made of the effect of liquid pressure on the tilting plate to leave clear a passage consistent with the pressure of the liquid flowing to the tilting plate.

The present invention will be further elucidated on the basis of the following description of embodiments thereof as shown in the annexed drawings, wherein the same reference numerals are used for the same or similar components, and in which.

Figure 1:
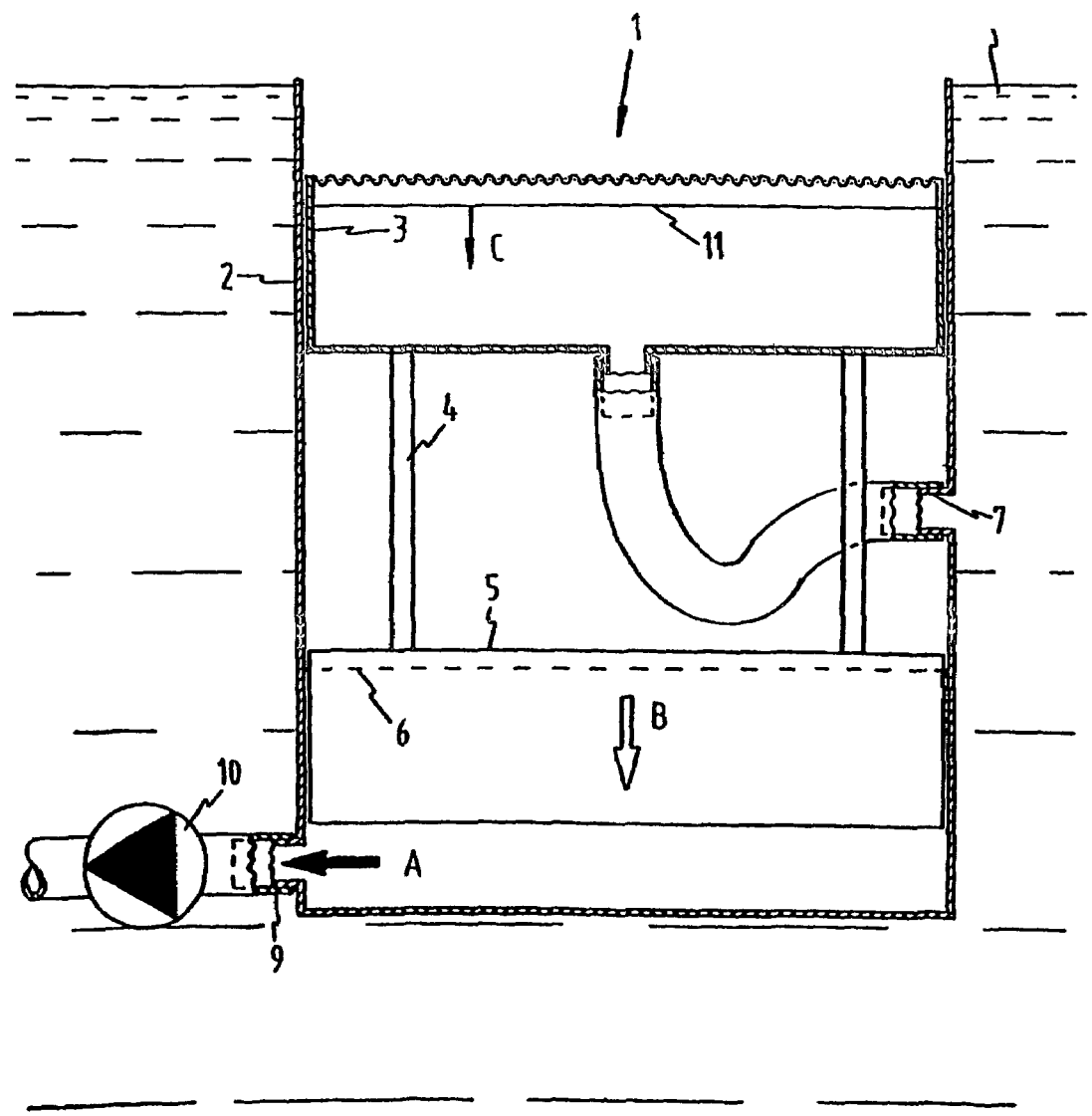
FIG. 1 shows a schematic view of a reservoir according to the present invention in a first situation.

FIG. 1 shows a reservoir 1 according to the present invention. Reservoir 1 comprises a container 2 in which a refill container 3 is arranged for up and downward movement. Refill container 3 is supported on a float 5 via carrier elements which can take the form of rods 4. Float 5 floats in water at the bottom of container 2, wherein the liquid level thereof is designated with line 6. Arranged in the container is an inlet 7 which connects onto refill container 3 on one side and to a body of liquid 8 on the other. Such a body of liquid can be a pond, an aquarium, a bath etc.

Reservoir 1 further comprises an outlet 9 which is connected to a throughfeed in the form of a pump 10.

With pump 10 in operation the water level in the bottom of container 2 drops in the direction of arrow B since liquid is drained through outlet 9 in the direction of arrow A.

Figure 2:
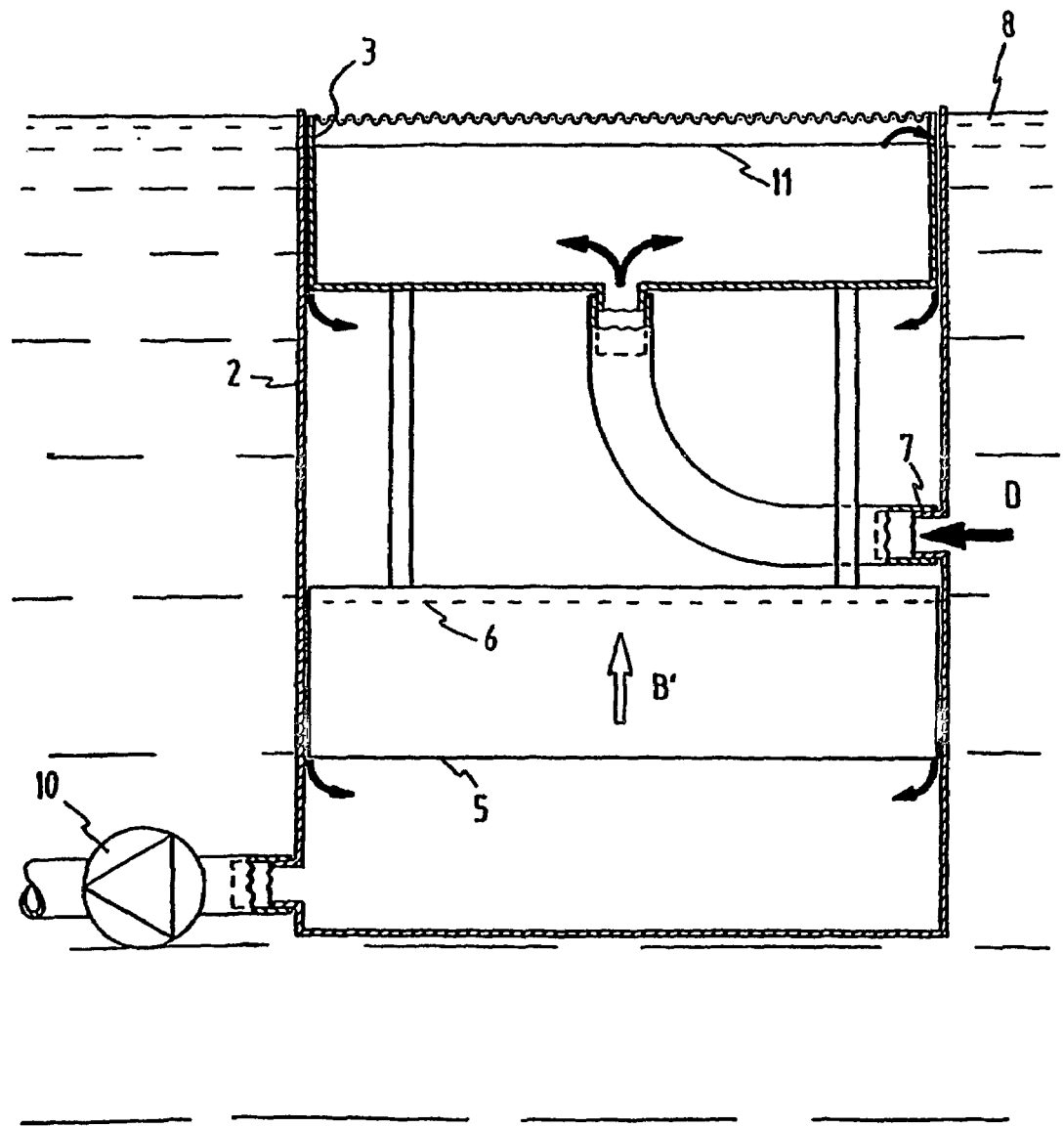
FIG. 2 shows the reservoir of FIG. 1 in a second situation.

Liquid herein flows out of refill container 3 over an overflow 11 in the direction of arrow C in order to replenish the liquid in the bottom of container 2. Refill container 3 is itself supplied here with liquid from body of liquid 8. This is also the case immediately after pump 10 has been taken out of operation. This situation is shown in FIG. 2. Because liquid flows into refill container 3 via inlet 7 as according to arrow D and flows over the overflow 11 of the refill container to the bottom of container 2, the liquid level rises in the bottom of container 2 in the direction of arrow B'. Float 5 herein rises in the same direction until the overflow 11 arrives at the same level as the liquid level in body of liquid 8. When this situation is reached, refilling from refill container 3 of the liquid level 6 in the bottom of container 2 is halted.

Figure 3:
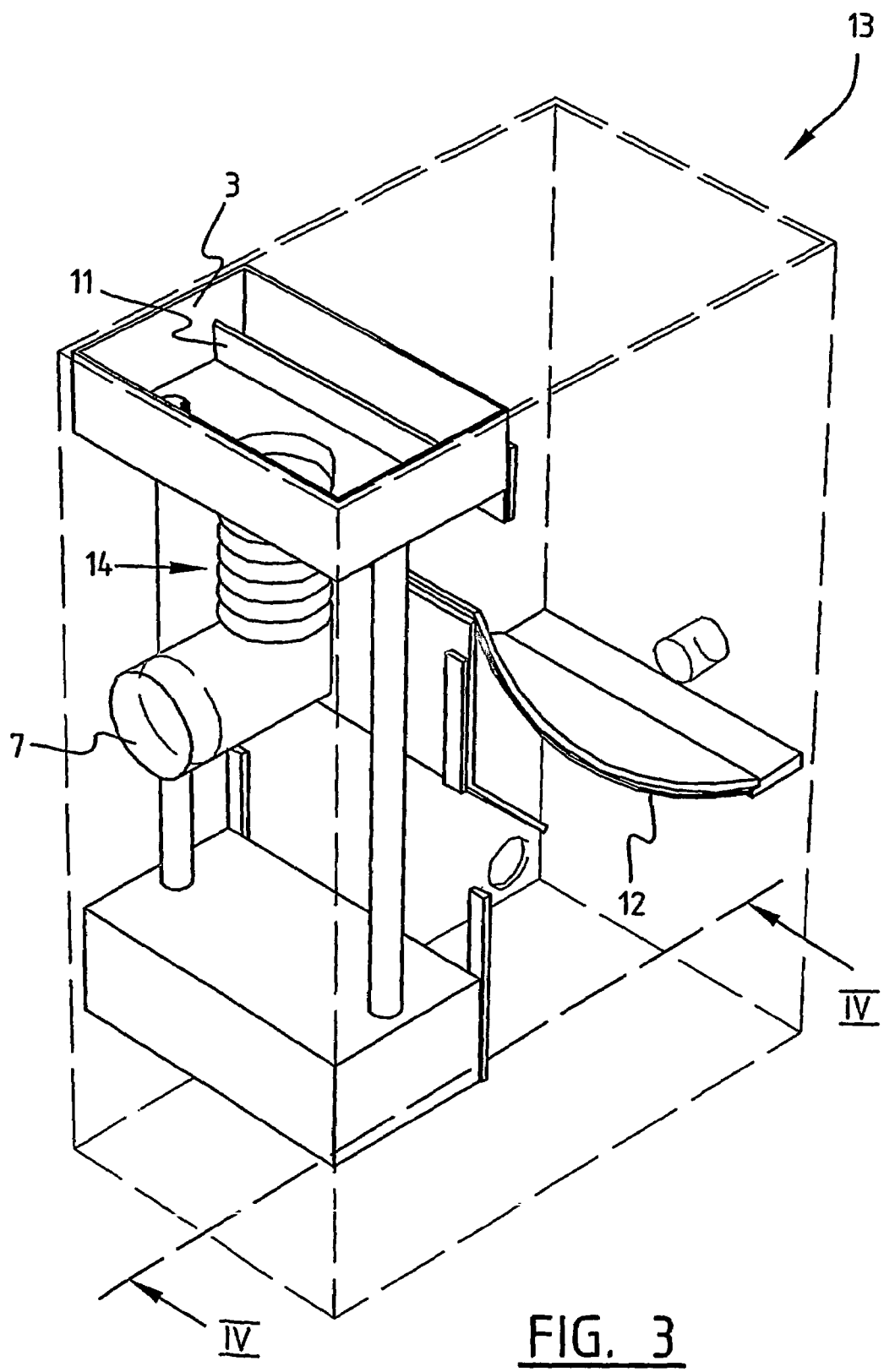
FIG. 3 shows schematically an alternative embodiment.

The pump 10 is thus prevented from being able to run dry within specifications to be further defined, and the desired supply is realized. Such specifications can relate to the amount of liquid which can or may be pumped at one time out of container 2, etc. Owing to the up and downward movement of the float, and thereby the refill container 3, sufficient supply and a proper operation of the pump can be ensured. It is also possible to realize functions other than just a supply function for liquid for the pump. As shown in FIG. 3, use can be made of an arcuate sieve 12 which, in an additional embodiment of a reservoir 13 according to the present invention, can be arranged under the overflow 11 on refill container 3. Another difference of the embodiment of reservoir 13 shown in FIG. 3 from the embodiment of FIGS. 1 and 2 is the use of the inlet conduit 14 which can be compressed in concertina-like manner and maintains an open connection between inlet 7 and refill container 3, even when conduit 14 is compressed in a low position of refill container 3.

Alternatively, elements other than the arcuate sieve 12 shown here can also be applied, such as debris sieves, debris filters and biofilters etc.

Figure 4:
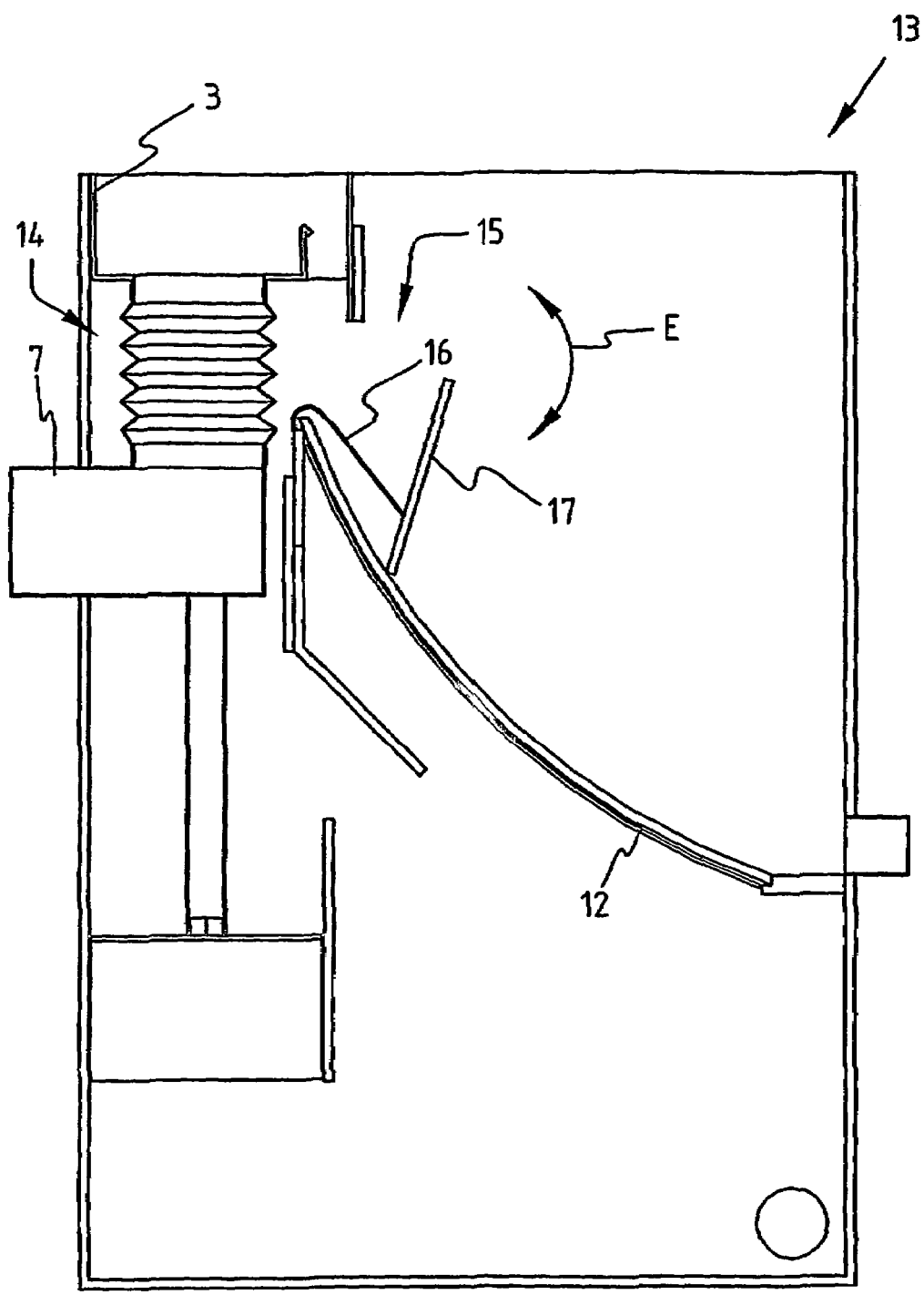
FIG. 4 shows a view in cross-section along line IV-IV in FIG. 3 with an addition.

FIG. 4 shows a side view in cross-section along the line IV-IV in FIG. 3. As addition to the view of FIG. 3, FIG. 4 shows a tilting plate 17 as a component of regulating means 15 for regulating a flow of liquid over arcuate sieve 12. Tilting plate 17 is suspended from arms 16 against the upper surface of arcuate sieve 12. When a liquid begins to flow out of refill container 3 and over the overflow 11, tilting plate 17 is pressed sideways and upwards in the direction of double arrow E to leave clear a passage over the surface of arcuate sieve 12 under the influence of the pressure of the liquid flowing thereto. Tilting plate 17 is positioned for this purpose at an acute angle (less than 90°) relative to the surface of arcuate sieve 12 at the location where the tilting plate 17 rests thereagainst when not in operation. It is noted that tilting plate 17 is suspended from arms 16 in tiltable and freely controllable manner. This means that a user can flush the arcuate sieve 12 by pulling the tilting plate 17 away from the surface of arcuate sieve 12 in the direction of arrow E. A greater flow of liquid will hereby develop and dirt which has collected on arcuate sieve 12 will be flushed therefrom.

It is further noted that it is possible to design the regulating means in diverse other ways. Use can thus be made of a movable plate suspended from stationary arms. Such stationary arms can be arranged (welded) on arcuate sieve 12 on one side and comprise a tilting point on the other side for coupling the arms and the tilting plate. It will be apparent that diverse other embodiments are also possible.

Figure 5:
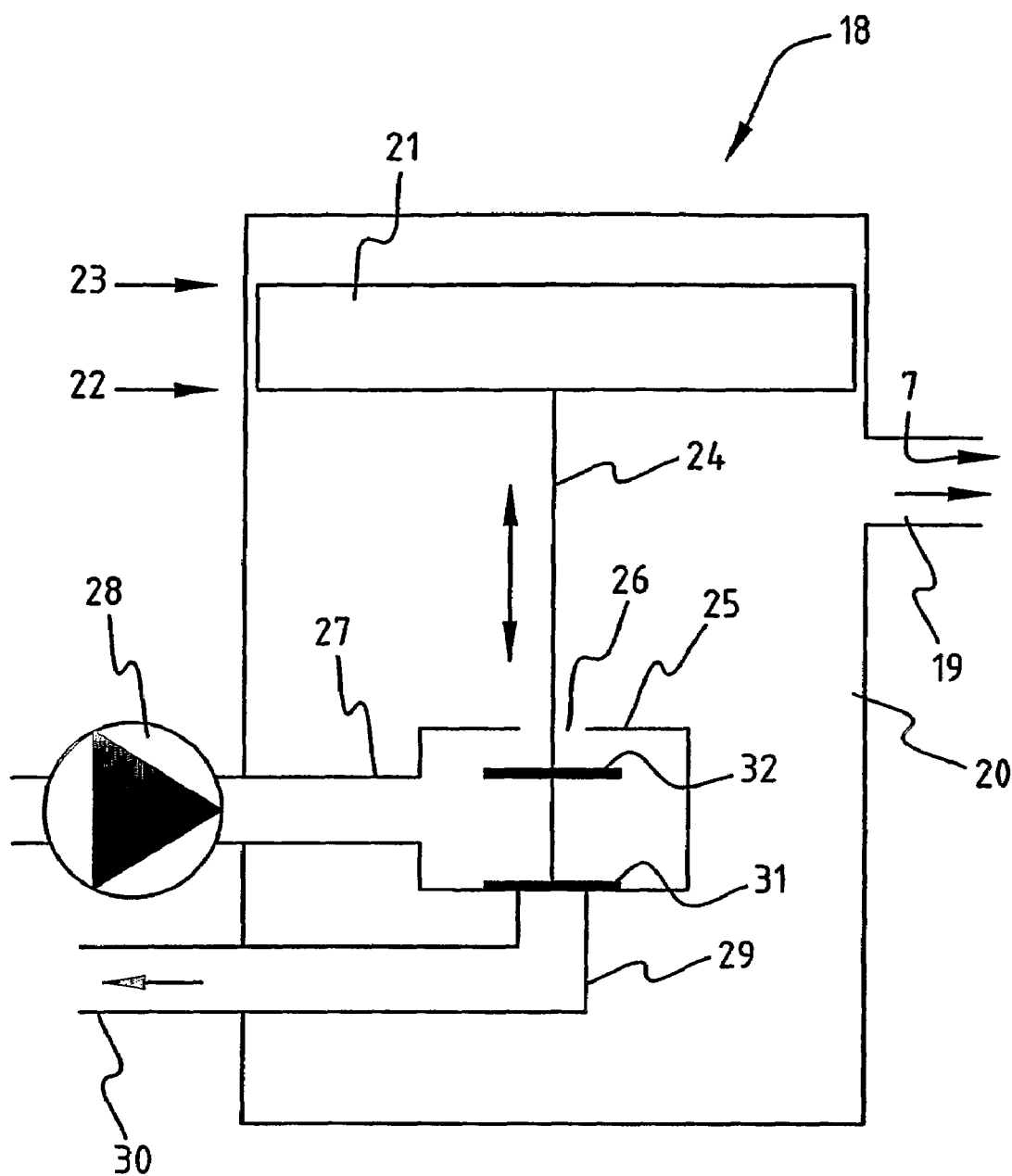
FIG. 5 shows schematically a buffering apparatus forming an addition to any one of the embodiments of the reservoir of the previous figures.

In FIG. 5 a supplemental buffering unit 18 is shown. The buffering unit 18 is represented as a separate apparatus, but may well be embodied as an integral component of any embodiment of a reservoir, as shown in the previous figures and described herein above. This is represented by the fact, that an exit 19 of a vessel 20, defining the buffering unit 18, is to be connected to the inlet 7 of the reservoir in the previous figures.

In the vessel 20 liquid is buffered, which is beneficial for the functioning of any of the reservoirs 1, 13 in the previous drawings or any other embodiment of such a reservoir according to the present invention. The amount of liquid buffered in the vessel 20 allows for a reservoir according to the previous figures or any other embodiment to be placed above the water level of the body of liquid, that is being treated with such a reservoir 1, 13 or any other embodiment. The buffering unit 18 allows for a sufficient supply of liquid to the reservoir 1, 13, etc., regardless of the placement thereof relative to the water level in the body of liquid. The functioning of the buffering unit 18 is as follows. On top of the liquid in the vessel 20, a floating body 21 is arranged, which is moveable between a minimum level 22 and a maximum level 23. The floating body 21 is connected to a rod 24, extending into a chamber 25 through an outlet 26 of the chamber. An inlet 27 of the chamber 25 is connected to a pump 28, which provides a supply of liquid from the body of liquid e.g. 8 in the previous figures, into the chamber 25. A further outlet 29, which is in the situation shown in FIG. 5 closed, forms a return duct 30 to the body of liquid.

With the floating body 21 in a lower position (as shown), corresponding with the minimum level 22 of liquid in the vessel 20, the outlet 29 to the return duct 30 is closed off with a valve 31. With the pump 28 in operation, liquid is provided into the chamber 25 via inlet 27 and out of the chamber 25 via the outlet 26, as a result of which the floating body 21 is raised, until it reaches the maximum level 23 of liquid in the vessel 20. With the floating body 21 in this higher position thereof, a second valve 32, which is also arranged on the rod 24, like the first valve 31, closes of the outlet 26, whereas the first valve 31 is raised from a position, in which it closes the other outlet 29 to the return duct 30. In such a state, operation of the pump can selectively be paused or interrupted, if desired.

Thus, a valve construction is formed by the assembly of the rod 24, that is connected to the floating body 21, with on the rod 24 the valves 31 and 32.

If a reservoir in an embodiment, that is shown in any of the previous figures, or any other embodiment, is set into operation, liquid is withdrawn from the vessel 20 via the exit 19 to the inlet 7. Thereby, the level of liquid in the vessel 20 is lowered, but simultaneously the outlet 26 is once again opened. Thus a fresh supply of liquid from inlet 27 into the vessel 20 is provided, enabling continued operation of the reservoir 1, 13 or any other embodiment. In order to further ensure a continued proper functioning of the reservoir 1, 13, preferably the pump 28 has a slightly higher capacity, than the throughput capacity of the reservoir 1, 13 or any other embodiment. If this is not the case, then the level of liquid in the vessel 20 may fall to a level below that of the exit 19, connected or connectable to the inlet 7, thus hampering proper functioning of the reservoir 1, 13. With a pump 28 having a higher capacity than the throughput capacity of the reservoir 1, 13, the higher 32 of the two valves 31, 32 will continuously and periodically close and open the outlet 26 of the chamber 25, whereby a sufficient supply to the reservoir 1, 13 is maintained.

It is noted here, that the floating body 21 can, in an alternative embodiment, be replaced by a membrane construction, upon which a force corresponding with an amount of liquid in the vessel 20 is allowed to act and which controls a different valve configuration to function in a manner similar to the operation of valve configuration 24, 31, 32. Such replacement in an alternative embodiment is well within the grasp of persons of sufficient skill in the art, which is why further description is omitted here.

In addition, many more embodiments are possible other than those explicitly shown and described here.

When a reservoir according to the present invention has as its only function the supply of liquid to the throughfeed (pump 10), uprights 4 can be omitted and refill container 3 can be arranged directly on float 5. The use is also shown of a flexible hose between inlet 7 and refill container 3, or the conduit 14 compressible in the manner of a concertina. Other options can be a slide connection or similar solution to place the interior of refill container 3 into communication with body of liquid 8. All such alternative and additional embodiments, to the extent that they lie within the scope of the definition of the present invention as according to the appended claims, fall within the scope of protection unless such embodiments clearly vary from these definitions of this scope of protection. It is thus also possible to make use, otherwise than with float 5, of other detecting means in order, on the basis of a detected liquid level in container 2, to adjust the position of refill container 3 or set it at a height such that the desired refilling function is realized. It is finally also noted that the refill container can be placed per se in stationary position in the container, but can then for instance be rotatable on a longitudinal axis thereof in order, through rotation, to adjust the height of the overflow 11, and thereby the degree of replenishment. When use is made of the float in such a construction, the uprights 4 can once again be coupled to the refill container, but then be used to adjust the tilting position of refill container 3 subject to the liquid level 6 in container 2.

The invention claimed is:

1. A reservoir for a liquid throughfeed, at least one of from and to a body of liquid, the reservoir being operable selectively and comprising:
    a container for containing liquid, having an ouilet for connection to the throughfeed; and
    a refill container which, depending on the level of the liquid in the container, is movable reciprocally between a first position and at least one second position, and which is connected to an inlet of the reservoir for connection to the body of liquid, wherein the refill container comprises an overflow to allow liquid to flow from the refill container into the container when the refill container is in the at least one second position,
    wherein a float is arranged in the container, which float supports the refill container for movement thereof between the high position and the at least one lower position depending on the level of the liquid in the container.

2. Reservoir as claimed in claim 1, wherein at least one carrier element is arranged between the float and the refill container.

3. Reservoir as claimed in claim 1, wherein the float has a buoyancy which suffices to bring the refill container into the high position in the situation where it is fully filled with liquid, in which high position the level of liquid in the reffil container lies at the very lowest at the level of liquid in the body of liquid.

4. Reservoir as claimed in claim 3, wherein the reservoir can be placed in or at the body of liquid, and the container shields the refill container, and in particular the overflow thereof, from liquid in the body of liquid.

5. Reservoir as claimed in claim 1, wherein at an outlet of the overflow there is an element including at least one of a filter and a sieve.

6. Reservoir as claimed in claim 5, further comprising regulating means for adjusting a liquid at least one of on and over the element.

7. Reservoir as claimed in claim 6, wherein the regulating means comprise a tilting plate which when not in operation rests against the element and which is adapted during operation to leave clear a passage for liquid at least one of on and over the element at least one of in automatic, controlled, manual manner and under the influence of liquid pressure.

8. Reservoir as claimed in claim 1, further comprising, a buffering unit.

9. Reservoir as claimed in claim 8, where the buffering unit comprises a vessel with a valve construction operable by a floating body to selectively allow flow of liquid to at least one of the refill container and to the body of liquid.

10. Reservoir as claimed in claim 9, where the valve construction is arranged in a chamber having a chamber inlet connectable to a pump arranged to supply liquid from the body of liquid and at least two chamber outlets, which are selectively and respectively closed by the valve construction and of which one of the chamber outlets is connectable to a return duct to the body of liquid and another chamber outlet is connectable to an interior portion of the vessel, and where an outlet of the vessel is connected or connectable to the inlet and thereby to the refill container.

11. Reservoir as claimed in claim 2, wherein the float has a buoyancy which suffices to bring the refill container into the high position in the situation where it is fully filled with liquid, in which high position the level of liquid in the refill container lies at the very lowest at the level of liquid in the body of liquid.

12. Reservoir as claimed in claim 1, wherein said liquid throughfeed is a liquid pump.

* * * * *